United States Patent [19]

Schwartz

[11] Patent Number: 4,713,569
[45] Date of Patent: Dec. 15, 1987

[54] LOW COGGING MOTOR

[75] Inventor: Myron Schwartz, St. James, N.Y.

[73] Assignee: 501 Aeroflex Laboratories, Incorporated, Plainview, N.Y.

[21] Appl. No.: 876,634

[22] Filed: Jun. 20, 1986

[51] Int. Cl.⁴ .......................................... H02K 21/00
[52] U.S. Cl. .................................... 310/152; 310/156
[58] Field of Search .................... 310/67, 152, 156, 46

[56] References Cited

U.S. PATENT DOCUMENTS

| | | | |
|---|---|---|---|
| 3,149,256 | 9/1964 | Kohlhagen | 310/156 |
| 3,333,129 | 7/1967 | Kohlhagen | 310/156 |
| 3,860,843 | 1/1975 | Kawasaki | 310/67 |
| 4,280,072 | 7/1981 | Gotou | 310/156 X |
| 4,438,362 | 3/1984 | Brown | 310/156 X |

Primary Examiner—Donovan F. Duggan
Attorney, Agent, or Firm—Wolder, Gross & Yavner

[57] ABSTRACT

A three phase, permanent magnet rotor, AC electric motor includes a twenty-four unskewed slot stator wound in a three phase arrangement and an eight pole permanent magnet rotor in which the rotor pole pieces are unskewed and angularly displaced from equally 45° spaced reference positions about the rotor by different amounts which are integral multiples of 1.875°. The cogging frequency is eight times higher and the cogging torque are eighth that of a corresponding motor with a conventional permanent magnet rotor.

4 Claims, 2 Drawing Figures

LOW COGGING MOTOR

BACKGROUND OF THE INVENTION

The present invention relates generally to improvements in electric motors and more particularly to an improved permanent magnet rotor electric motor in which cogging is minimized.

An important problem encountered in the operation of conventional electric motors and particularly AC motors with permanent magnet rotors, is that of cogging—that is, the presence of non-linear magnetic rotational forces. The presence of appreciable amounts of cogging significantly reduces the efficiency, reliability and uniform operation of the motor. Numerous expedients have been employed to reduce the cogging in electric motors, including that of skewing the stator, using an odd number of winding housing slots relative to the product of the number of phases and magnetic poles, as well as the skewing of the rotor magnets. However, these expedients possess many drawbacks and disadvantages, are awkward and inconvenient, are of limited application and effectiveness and otherwise leave much to be desired.

SUMMARY OF THE INVENTION

A principal object of the present invention is to provide an improved electric motor.

Another object of the present invention is to provide an improved electric motor having reduced cogging effects.

Still another object of the present invention is to provide an improved low cogging electric motor of relatively simple construction.

A further object of the present invention is to provide an improved AC motor with a permanent magnet rotor having minimal cogging properties.

Still a further object of the present invention is to provide an improved electric motor of the above nature characterized by its high efficiency, reliability, uniformity of operation, ruggedness, low cost and great versatility and adaptability.

The above and other objects of the present invention will become apparent from a reading of the following description taken in conjunction with the accompanying drawings which illustrate a preferred but nonetheless illustrative embodiment thereof.

An electric motor in accordance with the present invention includes a stator and a rotor having a predetermined number of magnetic poles characterized in that the rotor poles are displaced by different angles from respective corresponding reference positions which are mutually equally spaced by angles equal to 360° divided by the number of rotor poles.

The motor is an alternating current motor, the stator being multipolar with longitudinal slots between successive poles for accommodating the stator windings which are connected in a single or multiphase arrangement for producing a rotating magnetic field. The displacement of the rotor poles from the reference positions are each equal to a predetermined fixed increment or an integral multiple thereof, such increment being equal to 360° divided by the product of the number of stator poles and the number of rotor poles.

The rotor poles are advantageously permanent magnets, with the displacements being achieved by varying the peripheral widths or edge to edge spacings of the magnetic poles. Alternatively, the rotor poles may be induced, for example as in the conventional squirrel cage rotor, in the known manner, the rotor shorting bars being spaced so as to effect magnet poles spaced as explained above.

The improved motor possesses a highly reduced cogging which is approximately equal to the reciprocal of the number of magnet poles and the cogging frequency is increased by a factor equal to the number of poles. Thus, the motor achieves the many advantages attendant to the reduced cogging and increased cogging frequency.

DESCRIPTION OF THE PREFERRED EMBODIMENT

Figure 1:
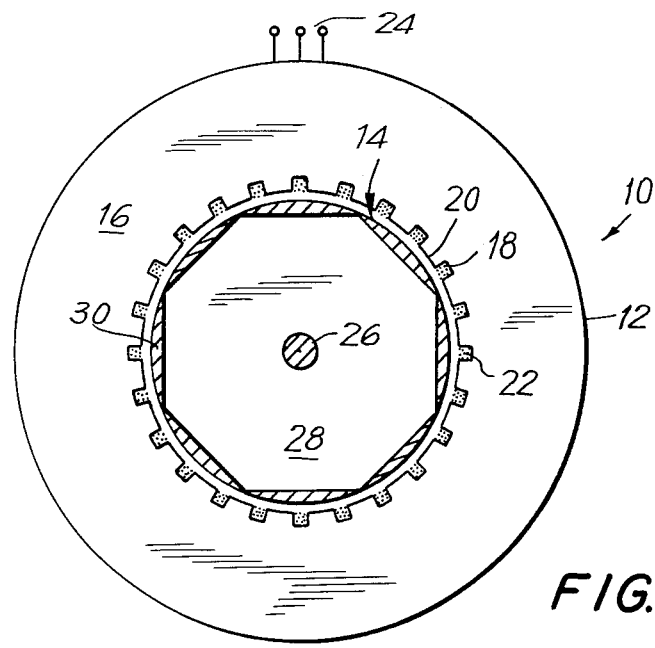
FIG. 1 is a diagrammatic transverse sectional view of a motor embodying the present invention.

Referring now to the drawings which illustrate a preferred embodiment of the present invention as applied to a three phase alternating current electric motor having a permanent magnet rotor, the reference numeral 10 generally designates the improved motor which includes a stator 12 and a permanent magnet rotor 14. The motor 10, except as explained herein, may be of conventional construction.

The stator 12 includes an annular core 16 is formed of magnetically soft steel laminates of known composition, and has twenty-four regularly spaced longitudinal, unskewed slots 18 formed in its inside face, the slots 18 delineating unskewed, pole defining ridges 20 therebetween. Nested in slots 18 are conventional motor stator windings 22, which are connected in a three phase relationship and connected by conductors 24 to a source of three phase alternating current.

The rotor 14 is coaxially located within the annual core 16 of stator 12 and is rotatably supported by a drive shaft 26. Rotor 14 includes a hub or core section 28 of approximately octagonal outside transverse cross section. Affixed to the outside faces of hub 28 are eight permanent, magnet pole pieces 30 whose outside faces or poles are alternately north and south around the periphery of the hub 28. The magnet pole pieces 30 have cylindrical outer faces, coaxial with shaft 26 and are closely spaced to the inside face of stator 12. The spacings between the proximate edges of successive pole pieces 30 are of amounts such that the effective medial longitudinal axis of the outside faces of the pole pieces 30 are displaced by different angles from the respective corresponding reference positions about the circumference of the stator, which are mutually equally angularly spaced by 45°, each displacement therefrom being an integral multiple of 1.875°.

Figure 2:
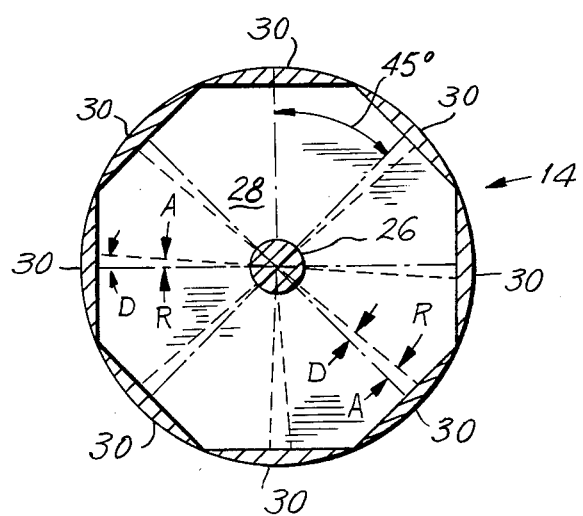
FIG. 2 is a diagrammatic transverse sectional view of the rotor thereof and the dimensional relationships of its components.

The following table sets forth the angular positions of the regular spaced reference positions which are labelled "Reference" (corresponding to the spacing of the pole pieces of a conventional eight pole rotor); the angular displacement from the respective reference ("Displacement") positions of the pole pieces 30 and the actual angular positions of the pole pieces 21 about the stator ("Actual"). As illustrated in FIG. 2 of the drawings the 45° angularly spaced references are shown by dot and dash lines and are designated R, the radial medial axes of the rotor pole pieces 30 are shown by broken lines and are designated A, and the angular displacements of the pole piece axes A from respective adjacent references are designated D.

| Reference | Displacement | Actual |
|---|---|---|
| 0 | 0 | 0 |
| 45 | 3.75 | 48.75 |
| 90 | 7.5 | 97.5 |
| 135 | 11.25 | 146.25 |
| 180 | 13.125 | 193.125 |
| 225 | 9.375 | 234.375 |
| 270 | 5.625 | 275.625 |
| 315 | 1.875 | 316.875 |
| 0 | 0 | 0 |

As seen from the table the angular displacement of the pole pieces from the reference positions are different from each other; each displacement is 1.875° or an integral multiple thereof. Accordingly, the improved rotor will have a point of maximum attraction every 1.875° of rotor rotation. This is a factor of eight higher in frequency and a cogging torque reduction of a factor of eight as compared to that of a corresponding motor with a conventional permanent magnet rotor.

It should be noted that while the pole pieces 30 in the present embodiment are similarly shaped and dimensioned, the differences in their displacements from the reference positions being achieved by varying the edge to edge distances between successive pole pieces 30, the required displacement distances may be achieved by appropriately varying the widths of the pole pieces 30 while maintaining the adjacent edges of successive pole pieces contiguous or equally spaced. In either case the stator core 28 may be a regular octagon in section, such that any imbalance through the use of differently sized or arranged pole pieces 30 around the circumference is minimal.

Moreover, although the cogging reducing mechanism of the present invention has been described as applied to a permanent magnet rotor it may be effectively be applied to a squirrel cage induction motor by varying the spacing between successive shortening bars, so that the displacements from the equally spaced reference positions are in the manner described above.

While there has been described and illustrated a preferred embodiment of the present invention it is apparent that numerous alterations, omissions and additions may be made without departing from the spirit thereof.

What is claimed is:

1. An AC electric motor comprising a stator having a predetermined number of stator poles and stator windings which are AC energized to produce a rotating magnetic field and a rotor having a predetermined number of permanent magnet rotor poles characterized in that said rotor poles are circumferentially displaced by different displacement angles from respective corresponding reference positions which are mutually equally spaced about said rotor by angles equal to 360° divided by said predetermined number of rotor poles, each of said displacement angles being equal to an integral multiple of 360° divided by the product of the number of stator poles and the number of rotor poles.

2. The electric motor of claim 1 wherein said rotor poles are unskewed.

3. The electric motor of claim 2 wherein said rotor poles are substantially similarly shaped and dimensioned and the spacing between the proximate edges of successive rotor poles are varied in accordance with said displacements.

4. An AC electric motor comprising a stator having twenty-four poles and stator windings which are AC energizable to produce a rotating magnetic field and a rotor having eight permanent magnet rotor poles characterized in that said rotor poles are circumferentially displaced by different displacement angles from respective corresponding reference positions which are mutually equally spaced about said rotor by angles of 45°, each of said displacement angles being equal to an integral multiple of 1.876°.

* * * * *